(12) United States Patent
Thiruvillamalai et al.

(10) Patent No.: US 10,423,515 B2
(45) Date of Patent: Sep. 24, 2019

(54) RECORDING TOUCH INFORMATION

(75) Inventors: Varadarajan (TSV) Thiruvillamalai, Hyderabad (IN); Deepraj Sitaram Dixit, Hyderabad (IN); Tapas Ranjan Sahoo, Hyderabad (IN); Singireddy Neeraja Reddy, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 947 days.

(21) Appl. No.: 13/306,245

(22) Filed: Nov. 29, 2011

(65) Prior Publication Data
US 2013/0139115 A1 May 30, 2013

(51) Int. Cl.
*G06F 3/0488* (2013.01)
*G06F 11/34* (2006.01)
*G06F 3/041* (2006.01)

(52) U.S. Cl.
CPC ........ *G06F 11/3476* (2013.01); *G06F 3/0416* (2013.01); *G06F 3/0488* (2013.01); *G06F 11/3428* (2013.01); *G06F 11/3438* (2013.01); *G06F 2201/865* (2013.01)

(58) Field of Classification Search
CPC ........ G06F 3/041; G06F 3/017; G06F 3/0416; G06F 3/0481; G06F 3/0484; G06F 3/04883; G06F 9/44; G06F 11/3476; G06F 11/3428; G06F 11/3438
See application file for complete search history.

(56) References Cited

U.S. PATENT DOCUMENTS

| | | | |
|---|---|---|---|
| 7,127,524 B1* | 10/2006 | Renda | H04L 29/12 709/223 |
| 7,365,736 B2* | 4/2008 | Marvit et al. | 345/156 |
| 7,665,019 B2* | 2/2010 | Jaeger | 715/704 |
| 7,716,632 B2* | 5/2010 | Covely, III | G06F 11/3006 717/106 |
| 7,770,136 B2 | 8/2010 | Beeck et al. | |
| 7,917,755 B1 | 3/2011 | Giliyaru et al. | |
| 7,979,690 B1* | 7/2011 | Dyatlov | G06F 11/1417 711/161 |

(Continued)

OTHER PUBLICATIONS

Joselli, et al., "gRmobile: A Framework for Touch and Accelerometer Gesture Recognition for Mobile Games", Retrieved at <<http://ieeexplore.ieee.org/stannp/stamp.jsp?tp=&arnumber=5479100>>, VIII Brazilian Symposium on Games and Digital Entertainment (SBGAMES), Oct. 8-10, 2009, pp. 141-150.

(Continued)

*Primary Examiner* — Steven P Sax
(74) *Attorney, Agent, or Firm* — Dicke, Billig & Czaja, PLLC

(57) ABSTRACT

A method of recording user-driven events within a computing system includes receiving at a motion-sensitive display surface at least one user-performed gesture, which includes user movement of an object over the surface that recognizes such user interaction therewith. Touch information is generated corresponding to the at least one user-performed gesture. The touch information is configured to be provided to an application. The touch information is intercepted and recorded before it is provided to the application. The intercepted touch information is grouped into at least one chunk, and the at least one chunk is output to the application.

17 Claims, 5 Drawing Sheets

(56) References Cited

U.S. PATENT DOCUMENTS

| | | | |
|---|---|---|---|
| 8,436,821 B1* | 5/2013 | Plichta | G06F 3/04883 345/156 |
| 8,555,163 B2* | 10/2013 | Sood et al. | 715/704 |
| 8,555,385 B1* | 10/2013 | Bhatkar | G06F 21/556 726/22 |
| 8,707,176 B2* | 4/2014 | Muto et al. | 715/704 |
| 8,726,154 B2* | 5/2014 | de Leon et al. | 715/704 |
| 8,918,427 B1* | 12/2014 | Searls | G06F 17/30 707/791 |
| 2001/0035860 A1 | 11/2001 | Segal et al. | |
| 2003/0125956 A1 | 7/2003 | Lewis et al. | |
| 2006/0031786 A1 | 2/2006 | Hillis et al. | |
| 2006/0047713 A1* | 3/2006 | Gornshtein | G06F 17/30575 |
| 2006/0100877 A1* | 5/2006 | Zhang et al. | 704/260 |
| 2006/0187196 A1 | 8/2006 | Underkoffler et al. | |
| 2007/0112714 A1* | 5/2007 | Fairweather | 706/46 |
| 2008/0001923 A1* | 1/2008 | Hall | G06F 3/0418 345/173 |
| 2008/0010537 A1* | 1/2008 | Hayutin | G06F 11/3664 714/38.14 |
| 2008/0155515 A1 | 6/2008 | Stewart | |
| 2008/0165141 A1 | 7/2008 | Christie | |
| 2009/0094614 A1 | 4/2009 | Klementiev et al. | |
| 2009/0138846 A1* | 5/2009 | Shneerson | G06F 9/4443 717/106 |
| 2009/0182753 A1 | 7/2009 | Chang et al. | |
| 2009/0249300 A1 | 10/2009 | Vainer et al. | |
| 2010/0123724 A1 | 5/2010 | Moore et al. | |
| 2010/0146420 A1 | 6/2010 | Bharadwaj et al. | |
| 2010/0155153 A1* | 6/2010 | Zachut | 178/18.03 |
| 2010/0277411 A1* | 11/2010 | Yee | G06F 3/017 345/156 |
| 2011/0004868 A1 | 1/2011 | Bharadwaj | |
| 2011/0111798 A1 | 5/2011 | Jeon et al. | |
| 2011/0119581 A1* | 5/2011 | Bhogal et al. | 715/704 |
| 2011/0179100 A1* | 7/2011 | Kawai | 709/201 |
| 2011/0296303 A1* | 12/2011 | Duquene et al. | 715/704 |
| 2012/0192069 A1* | 7/2012 | Zhang et al. | 715/704 |
| 2012/0200523 A1* | 8/2012 | Westhues | G06F 3/0237 345/174 |
| 2012/0204155 A1* | 8/2012 | Ben-Artzi | G06F 11/3688 717/125 |
| 2012/0230391 A1* | 9/2012 | Huang et al. | 375/240.02 |
| 2012/0254809 A1* | 10/2012 | Yang | G06F 3/0346 715/863 |
| 2012/0259894 A1* | 10/2012 | Varley et al. | 707/795 |
| 2013/0073956 A1* | 3/2013 | Marti et al. | 715/704 |
| 2013/0120280 A1* | 5/2013 | Kukulski | G06F 3/04883 345/173 |
| 2014/0289621 A1* | 9/2014 | Sivakumar et al. | 715/704 |

OTHER PUBLICATIONS

"How to: Record User Interface Actions for Manual Tests Using Test Settings", Retrieved at <<http://msdn.microsoft.com/en-us/library/dd286736.aspx>>, Retrieved Date: Jul. 14, 2011, pp. 3.

"Accessibility QA Test Case: Object inspection Testing", Retrieved at <<http://www.mozilla.org/access/qa/win-ui-object-inspection.html>>, Retrieved Date: Jul. 14, 2011, pp. 4.

\* cited by examiner

RECORDING TOUCH INFORMATION

BACKGROUND

The process of correcting the bugs in a computer program is referred to as "debugging." The efficiency of the debugging process is greatly improved if each bug can be reproduced. Reproducing a bug generated in response to user-driven events requires that the user know the exact sequence of events that were performed that caused the bug to occur. Sometimes a bug results from the culmination of many events happening in a particular sequence that can be nearly impossible for a user to remember. The steps for reproducing a bug are often referred to as the "repro steps."

To complicate the debugging process even further, the person experiencing the bug may not be the same individual who will attempt to debug the program. Therefore, the person experiencing the bug conveys the sequence of events to the person who will debug the application. Conveying the sequence of events requires not only that the person experiencing the bug recall each of the events, but also that each event be conveyed accurately. If the person forgets a particular user-driven event or forgets the order of events, then the user-driven events will not be adequately reproducible. As a result, the bug may not be corrected.

Previous software solutions exist that are capable of recording user-driven events within an application program. These previous solutions suffer from a number of significant limitations, however, that impact their usefulness.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Previous software solutions exist that are capable of recording user-driven events within an application program, but these solutions suffer from a number of significant limitations, however, that impact their usefulness.

Touch enabled applications are becoming more common. Manual testing for touch-enabled applications would be enhanced if touch gesture recording were included. One embodiment is directed to a system and method for recording touch gestures for the manual testing of touch-enabled applications.

One embodiment is directed to a method of recording user-driven events within a computing system. The method includes receiving at a motion-sensitive display surface at least one user-performed gesture, which includes user movement of an object over the surface that recognizes such user interaction therewith. Touch information is generated corresponding to the at least one user-performed gesture. The touch information is configured to be provided to an application. The touch information is intercepted and recorded before it is provided to the application. The intercepted touch information is grouped into at least one chunk, and the at least one chunk is output to the application.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Computer systems often come equipped with various interfaces that allow users to input data or commands that when executed by a processor achieve a desired result (i.e., produce some output to produce the effects of the users' manipulation). Commonly known input interfaces include key entry pads (e.g., keyboard, telephone dial, push button, etc.), touch pads, or some form of mouse; and output interfaces typically include some type of display—along with other functional output. More recently, the input and output interfaces have been combined to reduce the number of peripheral devices needed for the computer system and provide for a more intuitive user experience. For example, touch-screens or touch panels are display overlays, which have the ability to display and receive information on the same screen. The effect of such overlays allows a display to be used as an input device, removing the keyboard and/or the mouse as the primary input device for interacting with the display's content.

Touch-screen technology includes a number of different types (e.g., resistive, surface wave, capacitive, infrared, etc.) and can take numerous forms of inputs. In the past, touch-screens were limited to offering simplistic, button-like touch selection input interfaces. More recently, however, gesture interfaces have been developed, which accept input in the form of hand/stylus movement. Such movement may include any combination of single or multiple finger or stylus tapping, pressure, waving, lifting, or other type of motion on or near the screen's surface. Such movement when performed in a certain order and/or pattern will be interpreted by the touch surface computer as a particular type of input.

Figure 1:
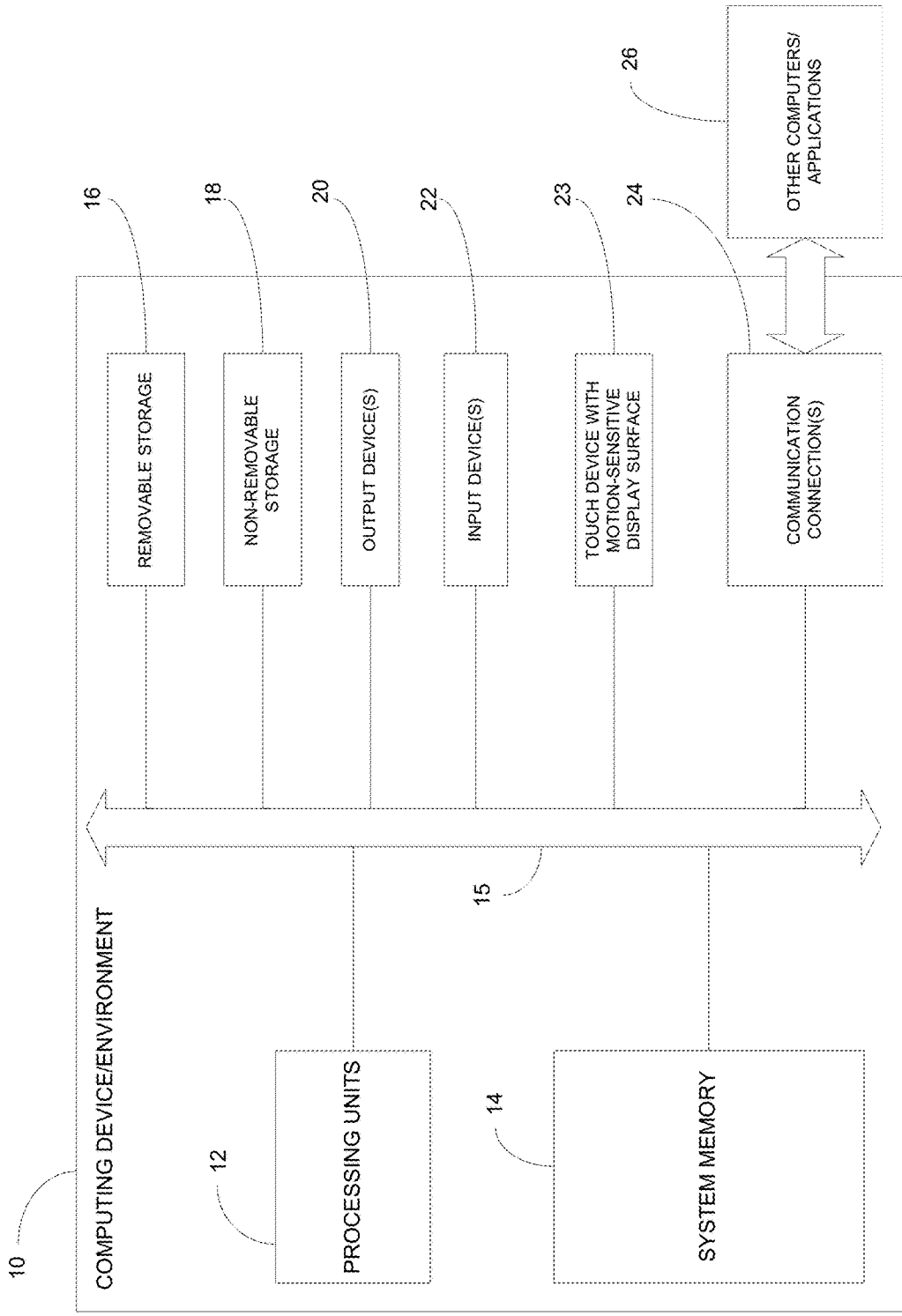
FIG. 1 is a block diagram illustrating a computing environment suitable for implementing aspects of a system for recording touch actions according to one embodiment.

FIG. 1 is a diagram illustrating a computing environment 10 suitable for implementing aspects of a system for recording touch actions according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional or different features/functionality and additional or different hardware and software. For example, computing device 10 may also include additional storage (removable and/or non-removable) including magnetic or optical disks or tape. Such additional storage is illustrated in FIG. 1 by removable storage 16 and non-removable storage 18. Computer storage media includes volatile and nonvolatile, removable and non-removable media implemented in any suitable method for non-transitory storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 10, and does not include transitory storage media. Any such computer storage media may be part of computing device 10.

The various elements of computing device 10 are communicatively coupled together via one or more communication links 15. Computing device 10 also includes one or more communication connections 24, such as network connections, that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc. In one embodiment, computing device 10 also includes a touch device with a motion-sensitive display surface 23.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
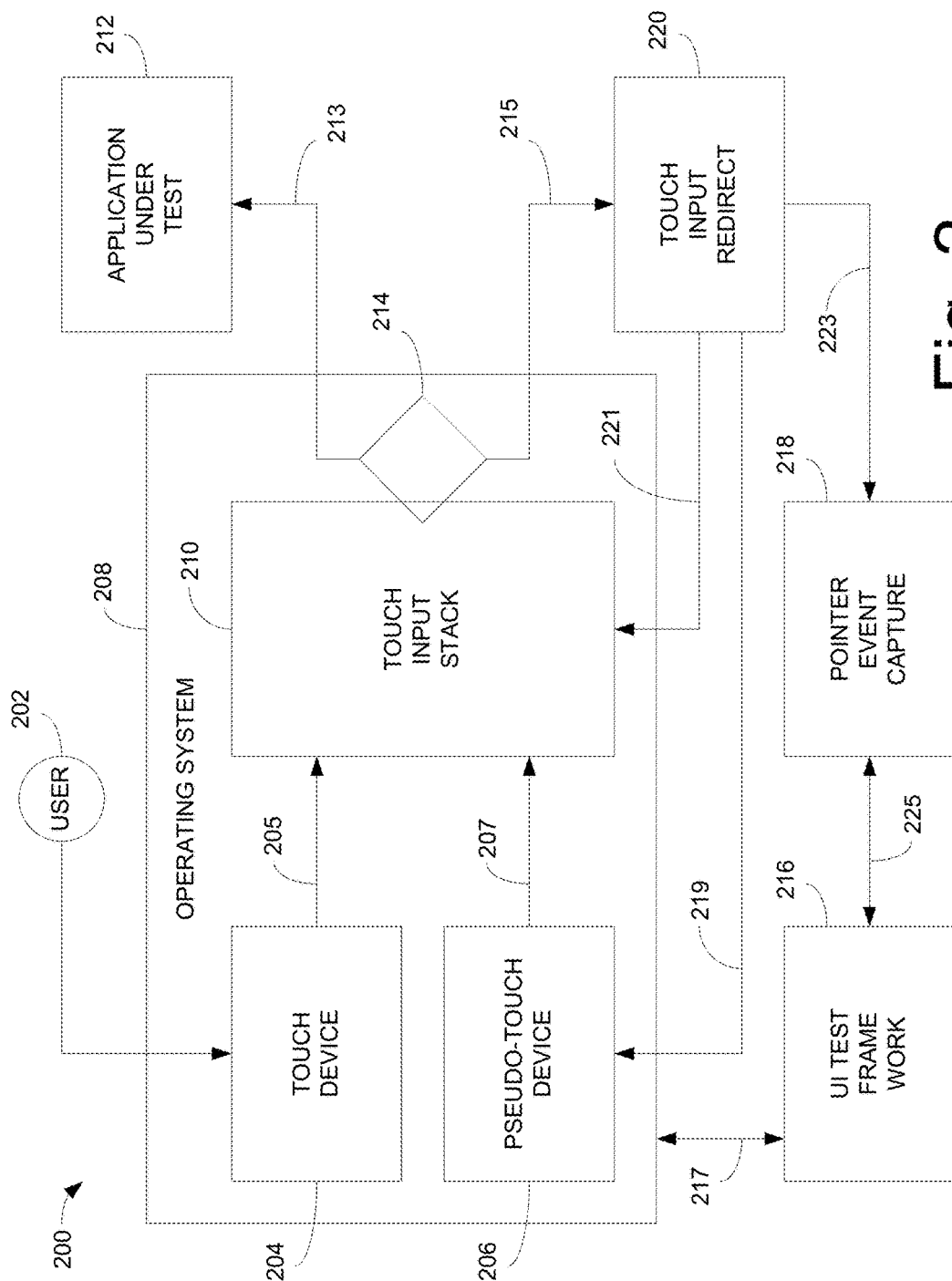
FIG. 2 is a block diagram illustrating a system for recording touch actions according to one embodiment.

FIG. 2 is a block diagram illustrating a system 200 for recording touch actions according to one embodiment. System 200 includes touch device 204, pseudo-touch device 206, operating system (OS) 208, touch input stack 210, application under test (AUT) 212, interface element 214, user interface (UI) test framework 216, pointer event capture unit 218, and touch input redirect unit 220. As shown in FIG. 2, touch device 204, pseudo-touch device 206, touch input stack 210, and interface element 214 are included in operating system 208.

System 200 according to one embodiment is configured to test application 212 while it is being used by a user 202. As an initial step, touch input redirect unit 220 registers with touch input stack 210, as represented by communication link 221. This communication informs the operating system 208 about the redirection of touch information. In operation according to one embodiment, the user 202 (e.g., a manual tester) interacts with application 212 using touch device 204. Touch actions performed by the user 202 on the application 212 are recorded by system 200, and the recorded touch information is used to create action logs. The action logs are used for creating rich bugs with reproduction (repro) steps.

In one embodiment, touch device 204 is configured to receive user input via a motion-sensitive display surface. The user input may be any type of motion via a bodily appendage, writing apparatus, stylus or other device that can communicate movement. In some embodiments, the user input may be a gesture. A gesture, as used herein, is any type of user movement or placement of an object (e.g., finger, hand, or other appendage, writing utensil, stylus, etc.) over or about the motion-sensitive display surface of the touch device 204. Objects may include, but are not limited to bodily appendages, writing utensils, and a stylus. In some embodiments, the touch device 204 may be configured to recognize (i) physical objects with added electronics for recognition, (ii) physical objects with a tag adhered to them, (iii) physical objects with a distinct shape, and (iv) physical objects with a distinct appearance. Any of these, or any combination thereof, could be used to input gestures. Accordingly, the term "gesture" as used herein is to be broadly interpreted to include any type of placement or movement of any arbitrary type of object or appendage. In addition, the user input need not be in direct contact with the motion-sensitive display surface of the touch device 204, but may also include motions near the surface as well. Touch device 204 may include any type of motion-sensitive surface including, but not limited to, touch screens or panels, touch tables, video camera based motion recognition devices, or any other device or mechanism capable of detecting and displaying motion.

In some embodiments, the user input provided through touch device 204 includes movements such as tapping, touching, touching and holding, sliding, dragging, waving, flicking, rubbing, peeling, increasing finger pressure to increase the diameter of the finger, two-finger motions toward each other, apart from each other, circling each other, or any other type of movement or combination of movements on or near the motion-sensitive display surface of the touch device 204. In fact, any one or combination of these types of movements could be a gesture. For example, a gesture may be a series of movements, performed in some type of sequential order.

Touch device 204 according to one embodiment generates a stream of touch frames based on the touch actions performed by user 202. The touch frames are output to touch input stack 210, as represented by communication link 205. Interface element 214 intercepts the touch frames generated by touch device 204 before they are delivered to the application 212. After intercepting the touch frames, the system 200 identifies the user interface control to which the touch information was supposed to be delivered, retrieves the properties of that control that will be used for recording, and then re-injects the stream of touch frames into the touch input stack 210 for delivery to the application 212. More specifically, the touch frames (e.g., pointer messages) are output from interface element 214 to touch input redirect unit 220, as represented by communication link 215. In one embodiment, touch input redirect unit 220 includes a queue for storing touch frames. Touch input redirect unit 220 provides information regarding the touch frames (e.g., pointer hints) to pointer event capture unit 218, as represented by communication link 223. Pointer event capture unit 218 communicates with UI test framework 216, as represented by communication link 225. Unit 218 and framework 216 work together to group the touch frames into chunks (with each chunk representing an isolated single-touch or multi-touch gesture), and record the chunks. In one embodiment, UI test framework 216 communicates with operating system 208, as represented by communication link 217, in order to receive mouse and keyboard event capture information, and to identify the user interface control to which the touch information was supposed to be delivered. UI test framework 216 also retrieves the properties of the identified control for use in recording the touch actions.

After processing and recording a given set of touch frames, the touch frames are re-injected into the stream of touch frames being delivered to the application 212. More specifically, touch input redirect unit 220 outputs the touch frames to pseudo-touch device 206, as represented by communication link 219. Pseudo-touch device 206 then outputs the touch frames to touch input stack 210, as represented by communication link 207. Interface element 214 then directs the touch frames to application 212, as represented by communication link 213. In one embodiment, the re-injection delay (i.e., the time between touch input redirect unit 220 receiving touch frames via communication link 215 and outputting touch frames via communication link 219) is small to help avoid a visually perceptual delay. In one embodiment, the re-injection is not delayed by more than 150 milliseconds. If the touch frames were not intercepted and later re-injected, but rather sent directly to the application 212, the system 200 would possibly not be able to accurately interpret the user interaction with the application 212 (e.g., the user may have navigated to a different UI element).

Touch interpretation engines typically rely significantly on time-characteristics of the touch interaction. For example, the distinction between Tap and Press-Hold or Pan and Flick are essentially based on the way touch events are spread over time. Distorting the time characteristics of the injected touch events may result in the application 212 not recognizing the intended gesture. In one embodiment, touch frames are grouped into chunks, with each chunk representing an isolated gesture, and intra-chunk timings are maintained when the chunks are re-injected.

Input touch events are grouped into chunks based on the target element to receive the touch events. The raw touch events (touch frames) generated by devices (e.g., touch device 204) are high-volume. If the system 200 were to incur a recording delay while processing each such event, it would negatively affect the overall system performance. Instead, as the recording hint is associated with the target UI element on which user is interacting, it suffices to pay the penalty only once for this target per user gesture. In one embodiment, primary pointer identification heuristics are used for this purpose, as described in further detail below.

After a chunk is processed and recorded, the chunk is adaptively re-injected. Each individual set of chunk data (i.e., each chunk), which corresponds to a user gesture, is buffered in the system 200. Once the acknowledgement of touch hint processing is received from the recording process, the associated chunk is immediately scheduled for re-injection. As hint processing timings may vary based on the complexity of the UI elements underneath, one odd occasional high delay does not affect the overall system's performance characteristics. Adaptive re-injection of chunks is described in further detail below.

Figure 3:
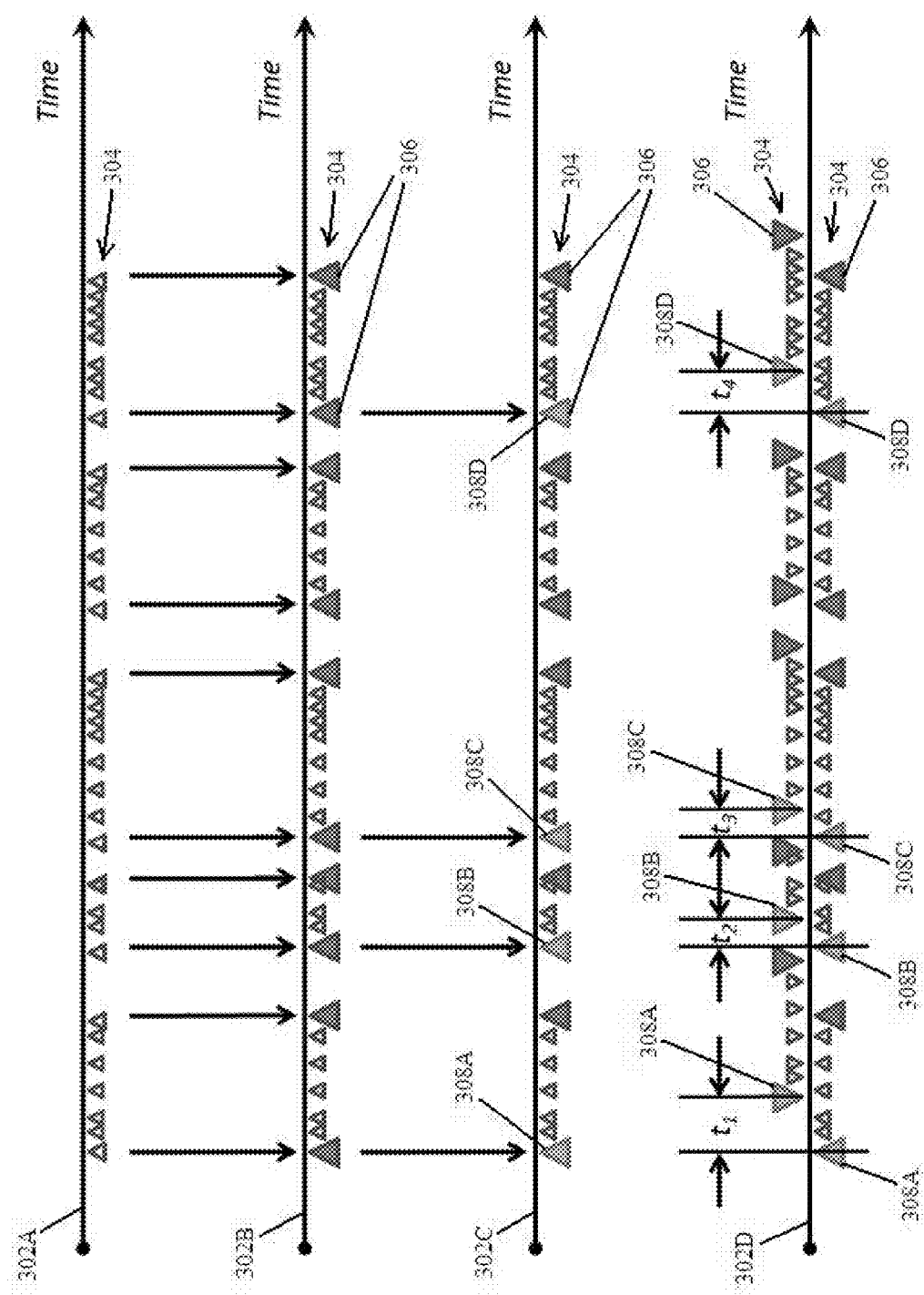
FIG. 3 is a diagram illustrating the grouping of touch frames into chunks and the re-injection of the touch frames according to one embodiment.

FIG. 3 is a diagram illustrating the grouping of touch frames into chunks and the re-injection of the touch frames according to one embodiment. There are four horizontal time axes 302A-302D shown in FIG. 3. In each of the time axes 302A-302D, each of the small rectangles 304 represents a touch frame. As shown on time axis 302A, a stream of touch frames 304 is generated by touch device 204 over time, with the stream of touch frames 304 representing a plurality of touch gestures. As shown on time axis 302B, a start frame and an end frame of each touch gesture is identified. The start frames and the end frames are represented by the larger rectangles 306, and define chunks of touch frames, with each chunk representing a touch gesture. As shown on time axis 302C, a set of the start frames that will trigger activation are identified, and are represented by larger triangles 308A-308D. For time axis 302D, the original touch frames are shown below the time axis, and the re-injected touch frames are shown above the time axis. As shown on time axis 302D, the re-injection of the start touch frame 308A is delayed by a time period, $t_1$; the re-injection of the start touch frame 308B is delayed by a time period, $t_2$; the re-injection of the start touch frame 308C is delayed by a time period, $t_3$; and the re-injection of the start touch frame 308D is delayed by a time period, $t_4$. The delay of touch frames that follow each start touch frame 308A-308D within a given chunk is the same as the delay of these frames in the original stream, so the inter-chunk timing may vary from the timing in the original stream, while the intra-chunk timing of the original stream is maintained so that injected events retain their time characteristics within a gesture.

As mentioned above, a first step in the recording of touch actions is to group the touch frames into chunks of isolated touch gestures. A goal of this process is to identify individual gesture actions (both in single as well as multi-touch scenarios) and tag all of the messages within it as one chunk. In one embodiment, each such chunk is processed by: (1) Identifying the specific message within this chunk that needs to be notified to the event capture unit 218; and (2) Redirecting this chunk to the application 212 without distorting any intra-message time differences in order for the gesture recognition engine of the application 212 to interpret the message correctly.

Figure 4:
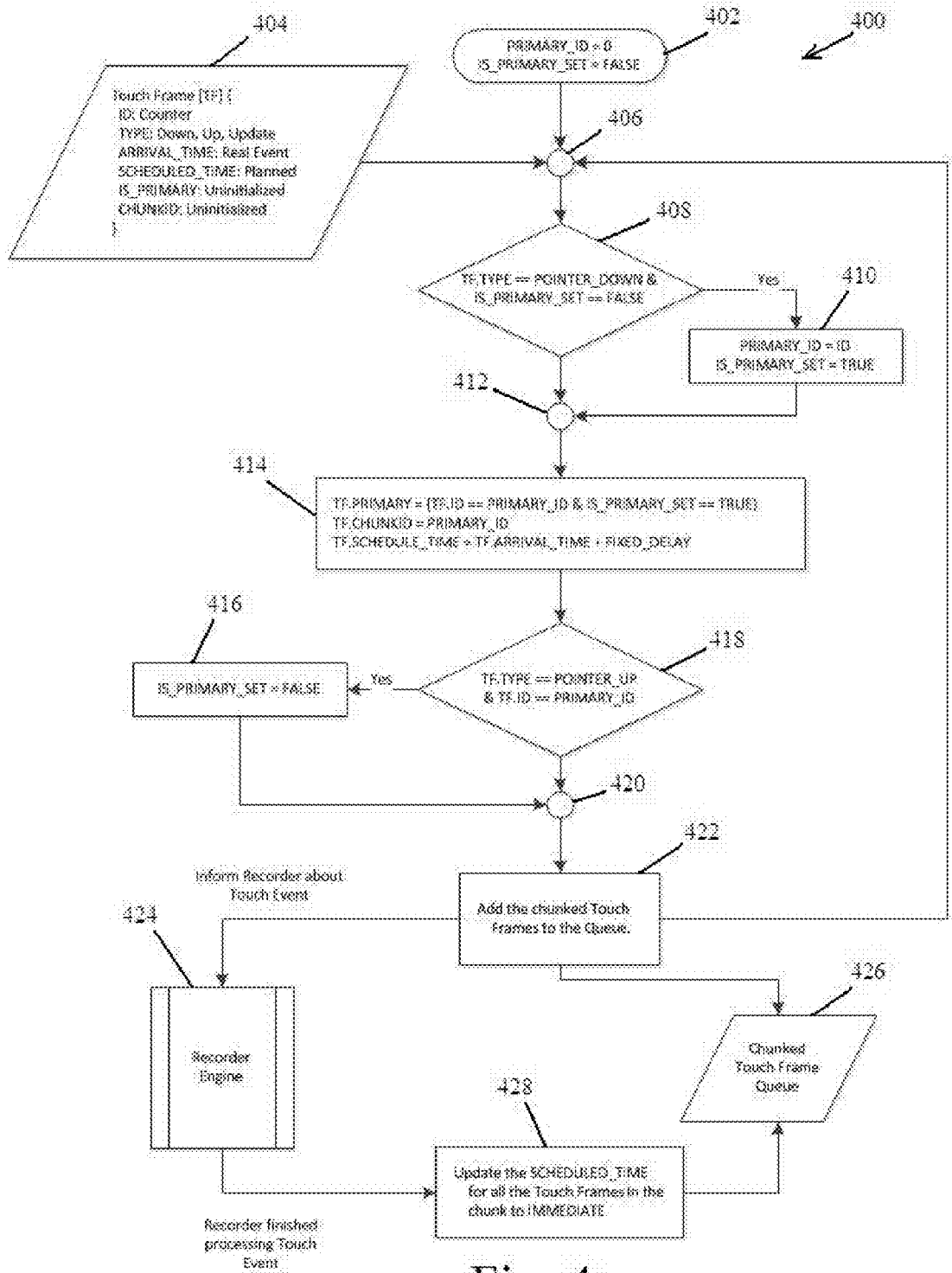
FIG. 4 is a flow diagram illustrating a method for identifying a gesture action (chunk) in a stream of touch frames according to one embodiment.

FIG. 4 is a flow diagram illustrating a method 400 for identifying a gesture action (chunk) in a stream of touch frames according to one embodiment. In one embodiment, system 200 (FIG. 2) is configured to perform method 400. At 402 in method 400, a current primary pointer ID (PRIMARY_ID) is set to an invalid ID (i.e., zero), and a primary pointer available flag (IS_PRIMARY_SET) is set to FALSE (i.e., zero). At 404 in method 400, a touch frame (TF) is provided. The touch frames are processed in the correct chronological order. In one embodiment, each touch frame (TF) includes several fields, including an ID (e.g., a counter), a TYPE (e.g., Down, Up, and Update), an ARRIVAL_TIME (a real event), a SCHEDULED_TIME (planned), an IS_PRIMARY flag, and a CHUNKID.

The method 400 moves from 402 and 404 to 406, and then to 408. At 408, it is determined whether the TYPE field of the current touch frame (TF) is a POINTER_DOWN flag, and whether the IS_PRIMARY_SET flag is FALSE. If it is determined at 408 that the TYPE field of the current touch frame (TF) is not a POINTER_DOWN flag, or the IS_PRIMARY_SET flag is not FALSE, the method 400 moves to 412. If it is determined at 408 that the TYPE field of the current touch frame (TF) is a POINTER_DOWN flag, and the IS_PRIMARY_SET flag is FALSE, the method 400 moves to 410. At 410, the PRIMARY_ID pointer is set equal to the ID field of the current touch frame (TF), and the IS_PRIMARY_SET flag is set equal to TRUE, and the method 400 moves to 412.

The method 400 moves from 412 to 414. At 414, the PRIMARY field of the current touch frame (TF) is set equal to (TF.ID==PRIMARY_ID & IS_PRIMARY_SET==TRUE); the CHUNKID field of the current touch frame (TF) is set equal to PRIMARY_ID; and the SCHEDULED_TIME field of the current touch frame (TF) is set equal to TF.ARRIVAL_TIME+FIXED_DELAY. At 418, it is determined whether the TYPE field of the current touch frame (TF) is a POINTER_UP, and whether the ID field of the current touch frame (TF) is equal to PRIMARY_ID. If it is determined at 418 that the TYPE field of the current touch frame (TF) is not a POINTER_UP, or the ID field of the current touch frame (TF) is not equal to PRIMARY_ID, then the method 400 moves to 420. If it is determined at 418 that the TYPE field of the current touch frame (TF) is a POINTER_UP, and the ID field of the current touch frame (TF) is equal to PRIMARY_ID, then the method 400 moves to 416. At 416, the IS_PRIMARY_SET flag is set to FALSE, and the method 400 moves to 420.

The method 400 moves from 420 to 422. At 422, the current touch frame (TF) is added to a chunked touch frame queue 426, the recorder engine 424 is informed about the touch event, and the method 400 returns to 406 to process the next touch frame. After the recorder engine 424 has finished processing the touch event, the method 400 moves to 428. At 428, the SCHEDULED_TIME field for all of the touch frames in queue 426 for the current chunk are set to IMMEDIATE.

Method 400 according to one embodiment causes touch frames to be grouped into chunks for redirection, with intra-chunk timings preserved. Primary pointer touch frames within each chunk are identified, and notification to the recorder's event capture unit 218 is filtered based on this identification.

As mentioned above, the chunked touch frames are adaptively re-injected. A goal in this process according to one embodiment is to perform the re-injection of the chunks as soon as an acknowledgement (ACK) for the notification to the recorder's event capture unit 218 has been received. This results in minimum perceivable delay of the touch action for the application 212.

As discussed above, method 400 stores touch frames in the queue 426 (e.g. a FIFO structure). In one embodiment, a schedule redirection time is also stored along with each touch frame. The pointer ID (CurrentPrimaryPointerIdForRedirection) of the last notification sent to the recorder's event capture unit 218 is tracked. On receiving the ACK from the recorder 424 (or a fixed upper limit delay, whichever is less), the redirection of the chunk to the target application 212 is started. Additionally, the redirection time of the remaining touch frames within that chunk are adjusted based on the ACK delay. After re-injection of all touch frames within a chunk, the ACK delay offset and the CurrentPrimaryPointerIdForRedirection are reset. This causes all of the touch frames within any given chunk to have their intra-chunk timings preserved, so the intended gesture is recreated by the target application 212, and the redirection delay is minimized by starting off a chunk redirection as soon as the ACK is received from the recorder 424.

Figure 5:
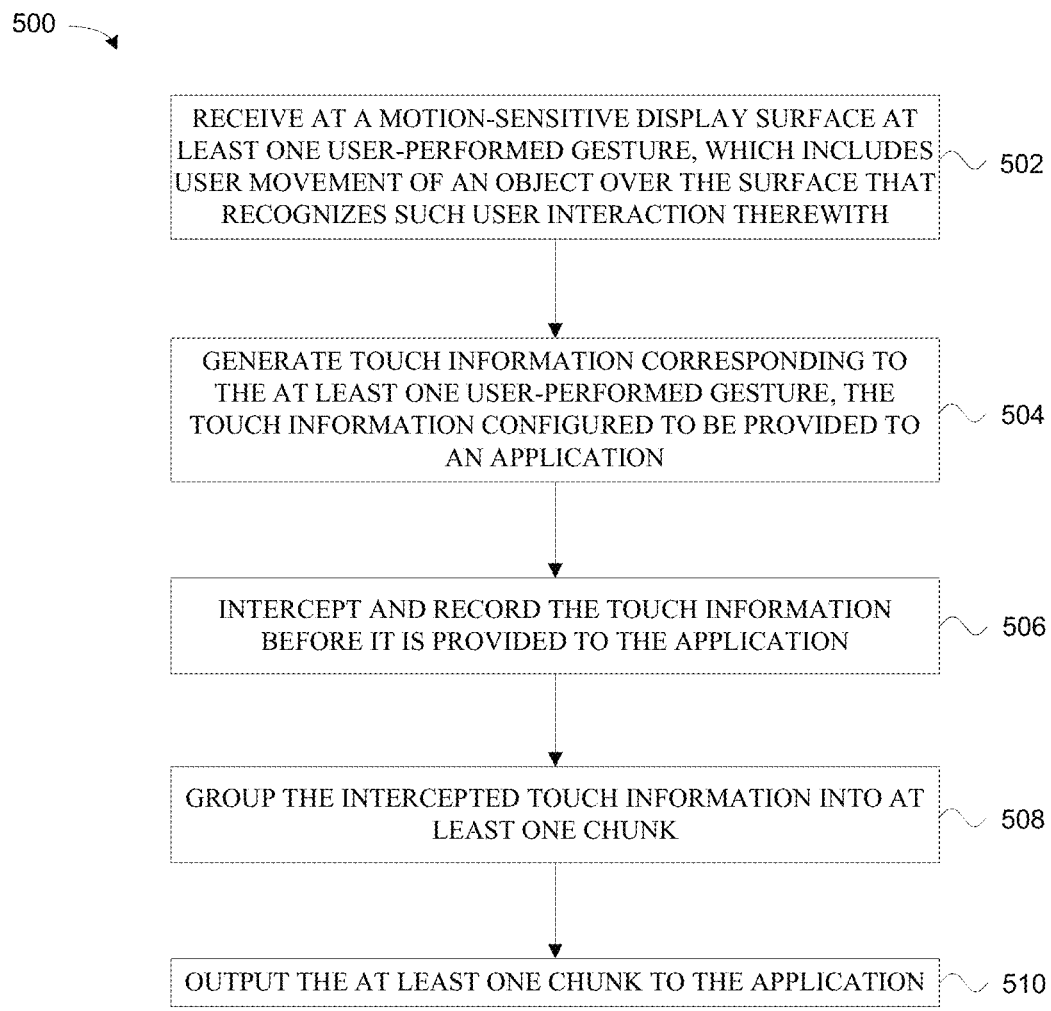
FIG. 5 is a flow diagram illustrating a method of recording user-driven events within a computing system according to one embodiment.

FIG. 5 is a flow diagram illustrating a method 500 of recording user-driven events within a computing system according to one embodiment. In one embodiment, system 200 (FIG. 2) is configured to perform method 500. At 502 in method 500, at least one user-performed gesture is received at a motion-sensitive display surface, which includes user movement of an object over the surface that recognizes such user interaction therewith. At 504, touch information is generated corresponding to the at least one user-performed gesture, the touch information configured to be provided to an application. At 506, the touch information is intercepted and recorded before it is provided to the application. At 508, the intercepted touch information is grouped into at least one chunk. At 510, the at least one chunk is output to the application.

In one embodiment of method 500, the at least one chunk comprises a plurality of chunks, and each of the chunks corresponds to a separate user-performed gesture. The touch information according to one embodiment comprises touch frames, and intra-chunk timing of the touch frames in each chunk is maintained. In one embodiment, timings between touch frames within each chunk are the same as timings between corresponding touch frames in the generated touch information. Inter-chunk timings according to one embodiment vary from corresponding timings in the generated touch information, and the inter-chunk timings vary from chunk to chunk.

In one embodiment of method 500, the intercepting and recording the touch information, the grouping the intercepted touch information into at least one chunk, and the outputting the at least one chunk to the application is performed in a manner that prevents a user-perceptible delay. In one embodiment, the intercepting and recording the touch information, the grouping the intercepted touch information into at least one chunk, and the outputting the at least one chunk to the application is performed in less than about 150 milliseconds.

In one embodiment of method 500, the method further includes: outputting the generated touch information to a touch input stack; intercepting and recording the touch information from the touch input stack before it is provided to the application; outputting the at least one chunk to the touch input stack; and outputting the at least one chunk from the touch input stack to the application.

In one embodiment of method 500, the user-performed gesture includes at least one of tapping, touching, touching and holding for a specified time, sliding, waving, flicking or dragging, and the object is at least one of a bodily appendage, writing utensil, or stylus.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of recording user-driven events within a computing system, comprising:

receiving at a motion-sensitive surface at least one user-performed interaction, which includes user movement of an object over the surface that recognizes such user interaction therewith;

generating touch information corresponding to the at least one user-performed interaction, wherein the touch information comprises touch frames, and wherein the touch frames are configured to be provided directly to an application;

intercepting the touch frames and redirecting the intercepted touch frames to a test framework for testing the application, and recording the intercepted and redirected touch frames with the test framework before it is provided to the application;

generating, with the test framework, a log based on the intercepted and redirected touch frames for debugging the application;

identifying, with the test framework, a sequence of input events including gestures, that caused a bug to occur in the application based on the generated log to facilitate elimination of the bug;

processing the intercepted and redirected touch frames into at least one chunk, wherein the at least one chunk comprises an adapted stream of touch frames with a set start frame and end frame, and wherein the at least one chunk represents at least one gesture; and outputting the at least one chunk to the application in a manner that prevents a user perceptible delay so the application can act on the at least one gesture represented by the at least one chunk.

2. The method of claim 1, wherein the at least one chunk comprises a plurality of chunks, and wherein each of the chunks corresponds to a separate user-performed gesture.

3. The method of claim 2, wherein intra-chunk timing of the touch frames in each chunk is maintained.

4. The method of claim 3, wherein timings between touch frames within each chunk are the same as timings between corresponding touch frames in the generated touch information.

5. The method of claim 2, wherein inter-chunk timings vary from corresponding timings in the generated touch information.

6. The method of claim 2, wherein inter-chunk timings vary from chunk to chunk.

7. The method of claim 1, wherein the intercepting and redirecting the touch frames, the recording the intercepted and redirected touch frames, the processing the intercepted and redirected touch frames into at least one chunk, and the outputting the at least one chunk to the application is performed in less than about 150 milliseconds.

8. The method of claim 1, and further comprising:
outputting the generated touch frames to a touch input stack; and
intercepting and redirecting the touch frames from the touch input stack, and recording the intercepted and redirected touch frames from the touch input stack before it is provided to the application.

9. The method of claim 8, and further comprising:
outputting the at least one chunk to the touch input stack; and
outputting the at least one chunk from the touch input stack to the application.

10. The method of claim 1, wherein the user-performed interaction includes at least one of tapping, touching, touching and holding for a specified time, sliding, waving, flicking or dragging.

11. The method of claim 1, wherein the object is at least one of a bodily appendage, writing utensil, or stylus.

12. A computer-readable storage device storing computer-executable instructions that when executed by at least one processor cause the at least one processor to perform a method of recording user-driven events within a computing system, the method comprising:

receiving at a touch device having a motion-sensitive surface at least one user-performed interaction, which includes user movement of an object over the surface that recognizes such user interaction therewith;

generating touch information with the touch device corresponding to the at least one user-performed interaction, wherein the touch information comprises touch frames, and wherein the touch frames are configured to be provided directly to an application;

intercepting the touch frames and redirecting the intercepted touch frames to a test framework for testing the application, and recording the intercepted and redirected touch frames with the test framework before it is provided to the application;

generating, with the test framework, a log based on the intercepted and redirected touch frames for debugging the application;

identifying, with the test framework, a sequence of input events including gestures, that caused a bug to occur in the application based on the generated log to facilitate elimination of the bug;

processing the intercepted and redirected touch frames into at least one chunk, wherein the at least one chunk comprises an adapted stream of touch frames with a set start frame and end frame, and wherein the at least one chunk represents at least one gesture; and outputting the at least one chunk to the application in a manner that prevents a user perceptible delay so the application can act on the at least one gesture represented by the at least one chunk.

13. The computer-readable storage device of claim 12, wherein the at least one chunk comprises a plurality of chunks, and wherein each of the chunks corresponds to a separate user-performed gesture.

14. The computer-readable storage device of claim 13, wherein intra-chunk timing of the touch frames in each chunk is maintained.

15. The computer-readable storage device of claim 14, wherein inter-chunk timings vary from corresponding timings in the generated touch frames.

16. The computer-readable storage device of claim 15, wherein inter-chunk timings vary from chunk to chunk.

17. A method of recording user-driven events within a computing system, comprising:

receiving at a motion-sensitive surface a plurality of user-performed interactions, which includes user movement of an object over the surface that recognizes such user interaction therewith;

generating touch frames corresponding to the user-performed interactions, the touch frames configured to be provided directly to an application;

intercepting the touch frames with a touch frame redirect unit and redirecting the intercepted touch frames to a test framework for testing the application, and recording the intercepted and redirected touch frames with the test framework before the touch frames are provided to the application;

generating, with the test framework, a log based on the intercepted and redirected touch frames for debugging the application;

identifying, with the test framework, a sequence of input events including gestures, that caused a bug to occur in the application based on the generated log to facilitate elimination of the bug;

processing the intercepted and redirected touch frames into a plurality of chunks, wherein each chunk comprises an adapted stream of touch frames with a set start frame and end frame, and wherein each chunk corresponds to one of the interactions and represents a gesture; and outputting the plurality of chunks to the application in a manner that prevents a user perceptible delay so the application can act on the gestures represented by the plurality of chunks.

* * * * *